(12) United States Patent
Chavan et al.

(10) Patent No.: US 12,271,280 B2
(45) Date of Patent: Apr. 8, 2025

(54) SYSTEMS AND METHODS FOR PERFORMING AUTOMATED END-TO-END TESTING OF COMPUTER SYSTEMS

(71) Applicant: T-Mobile Innovations LLC, Overland Park, KS (US)

(72) Inventors: Raju Chavan, Sitwell, KS (US); Aaron R. Haehn, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/179,274

(22) Filed: Mar. 6, 2023

(65) Prior Publication Data

US 2024/0303169 A1 Sep. 12, 2024

(51) Int. Cl.
*G06F 11/26* (2006.01)
(52) U.S. Cl.
CPC .................................. *G06F 11/26* (2013.01)
(58) Field of Classification Search
CPC ........................................................ G06F 11/26
See application file for complete search history.

(56) References Cited

U.S. PATENT DOCUMENTS

| | | | |
|---|---|---|---|
| 9,794,833 B1* | 10/2017 | Lei ..................... | H04W 36/0022 |
| 11,275,674 B1* | 3/2022 | Bryan .................... | G06F 11/368 |
| 2012/0311387 A1* | 12/2012 | Santhosh ............ | G06F 11/3433 |
| | | | 714/33 |
| 2016/0212073 A1* | 7/2016 | Kulkarni ............. | H04L 41/5093 |
| 2018/0287906 A1* | 10/2018 | Clements ............ | H04W 88/181 |
| 2021/0141708 A1* | 5/2021 | Mathur ................. | G06F 11/323 |

\* cited by examiner

*Primary Examiner* — Jigar P Patel

(57) ABSTRACT

A method for testing a computer system. The method includes executing by a testing tool a performance test case associated with a service of the computer system, and applying by the testing tool a load to the computer system in response to executing a sequence of actions of the performance test case. The method additionally includes monitoring by a monitoring tool experience parameters of the computer system that define a user experience of the service as the performance test case is executed, and aggregating by the monitoring tool the experience parameters. The method further includes communicating by the monitoring tool and actual result to the testing tool, and comparing by the testing tool the expected result of the performance test case with the actual result of the performance test case to evaluate the impact of the applied load to the experience of the service.

20 Claims, 7 Drawing Sheets

SYSTEMS AND METHODS FOR PERFORMING AUTOMATED END-TO-END TESTING OF COMPUTER SYSTEMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems, including networked computer systems, are tested in a variety of ways for a variety of purposes including to objectively validate that the computer system, including software executed thereon, works as intended in one or more different operating environments. Testing may be functional or non-functional in nature, where functional testing verifies whether the computer system can perform specific actions or functions while non-functional testing focuses on non-functional requirements of the computer system including performance, usability, testability, scalability, and security.

SUMMARY

In an embodiment, a method for testing a computer system accessible by a plurality of users is disclosed. The method includes executing by a testing tool of a testing system a performance test case associated with a service of the computer system accessible by the plurality of users of the computer system, wherein the performance test case defines a sequence of actions to be executed by the computer system and an expected result, and applying by the testing tool a load to the computer system in response to executing the sequence of actions of the performance test case. The method additionally includes monitoring by a monitoring tool of the testing system a set of one or more experience parameters of the computer system that define a user experience of the service for each of the plurality of users as the performance test case is executed, wherein the set of one or more experience parameters is each associated with a specific user of the plurality of users, and aggregating by the monitoring tool the set of one or more experience parameters, wherein the aggregated set of one or more experience parameters define an actual result of the performance test case. The method further includes communicating by the monitoring tool the actual result to the testing tool, and comparing by the testing tool the expected result of the performance test case with the actual result of the performance test case to evaluate the impact of the applied load to the experience of the service by the plurality of users.

In an additional embodiment, another method for testing a computer system accessible by a plurality of users is disclosed. The method includes executing by a testing tool of a testing system a performance test case associated with a service of the computer system accessible by a user of the computer system, wherein the performance test case defines a sequence of actions to be executed by the computer system and an expected result, and applying by the testing tool a load to the computer system in response to executing the sequence of actions of the performance test case whereby a volume of interactions on the computer system associated with the service increases incrementally. The method additionally includes monitoring by a monitoring tool of the testing system one or more experience parameters of the computer system that define a user experience of the service as the performance test case is executed and the volume of interactions associated with the service increases incrementally, wherein the one more monitored experience parameters comprise an actual result of the performance test case, and communicating by the monitoring tool the actual result to the testing tool. The method further includes comparing by the testing tool the expected result of the performance test case with the actual result of the performance test case to evaluate the impact of the applied load to the user experience of the service.

In a further embodiment, another method for testing a computer system accessible by a plurality of users is disclosed. The method includes provisioning a service of the computer system accessible by a user of the computer system with a set of resources of the computer system, and executing by a testing tool of a testing system a performance test case associated with the service of the computer system, wherein the performance test case defines a sequence of actions to be executed by the computer system and an expected result. The method additionally includes applying by the testing tool a load to the computer system in response to executing the sequence of actions of the performance test case, and monitoring by a monitoring tool of the testing system one or more experience parameters of the computer system that define a user experience of the service as the performance test case is executed, wherein the one more monitored experience parameters comprise an actual result of the performance test case. The method further includes communicating by the monitoring tool the actual result to the testing tool, comparing by the testing tool the expected result of the performance test case with the actual result of the performance test case to evaluate the impact of the applied load to the user experience of the service, and adjusting by an optimization tool of the testing system the set of resources of the computer system provisioned to the service based on the comparison by the testing tool between the expected result and the actual result.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
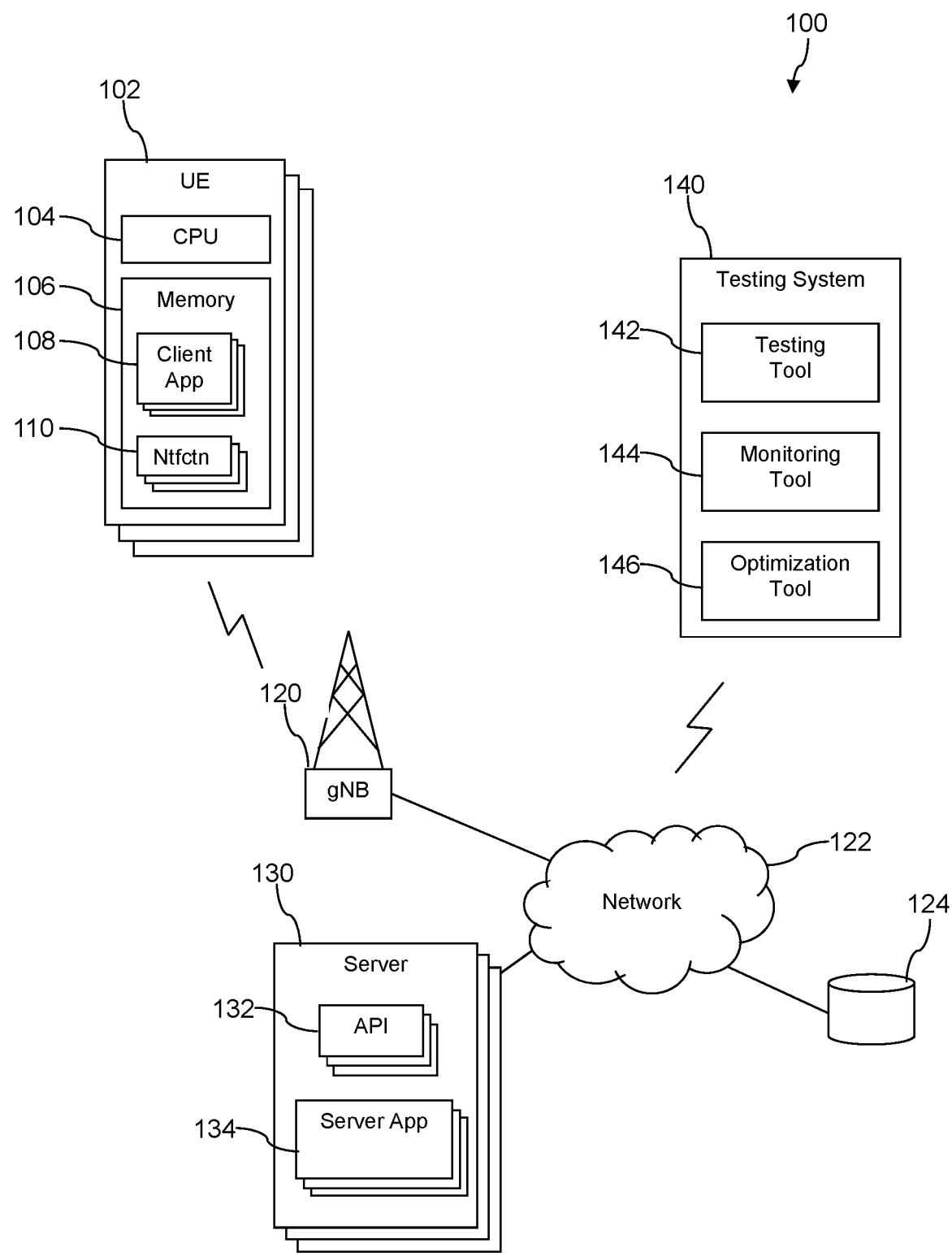
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "computer system" refers to both individual computer systems and networked computer systems which may collectively define a communication system. As described above, computer systems, including software executed thereon, may be subject to both functional and non-functional testing where functional testing verifies whether specific functions of the computer system adhere to predefined specifications (e.g., does a particular feature work or can a user perform a particular action?) while non-functional testing tests aspects of the computer system which are not directly related to a specific function or user action such as the performance, usability, testability, scalability, and security of the computer system.

Testing of the computer system may be conducted at different points of the lifespan of the computer system including initially when the intended requirements of the computer system are defined, when the architecture of the computer system is defined, when the computer system is constructed, and following the activation of the computer system whereby users are permitted to access one or more features or services offered by the computer system. Testing of the computer system may be conducted when a new release of the computer system or a new release of software are deployed. Following activation of the computer system, the system may be subject to end-to-end (E2E) testing intended to test the functionality and/or performance of the computer system (e.g., a software application executed on the computer system) under a live setting or product-like circumstances intended to replicate the live setting. The testing of computer systems may be performed using one or more test cases each of which generally define an input and an expected result based on the given input. Particularly, test cases utilized for testing the computer system may include several components including a unique identifier, a stated objective, a description including a series or sequence of actions to be performed, an expected result based on the description of the test case, and the actual result of the test case.

As described above, functional testing focuses on whether one or more specific functions of the computer system adhere to predefined specifications or requirements specific to the function being tested, including functional and business requirements. Particularly, functional testing is used to validate the behavior of the one or more functions subjected to testing, and focuses on the requirements of the user of the computer system. For example, functional testing may be used to verify a specific function of a given source code comprising a software application executed on the computer system. Thus, the objective and description of test cases associated with functional testing focus on functional requirements of the one or more functions being tested.

Further, functional testing may be categorized based on the "level" of the given functional test, where the testing level refers to the level of specificity of the given functional test. Particularly, functional testing can be broken down, from most specific to least specific, unit testing, integration testing, system testing, and acceptance testing. Unit testing refers to the testing of individual units or components of the computer system at the functional level. For example, unit testing of a computer system may include testing specific sections of code of a given software application. In this manner, unit testing may be used to verify the correctness and intended operability of the building blocks or units of a given software application but not of the software application itself which depends on, in addition to the operability of each building block, the interoperability of the building blocks comprising the given software application. The building blocks of a given software application may comprise individual functions, modules, objects, and the like.

Unit testing is conventionally the first level of functional testing that is performed on a computer system. Integration testing refers to the testing of integrated or linked building blocks or units of the computer system and may also be referred to as string testing and thread testing. As an example, integrated testing of a computer system may include integration testing of a plurality of separate components of a given software application. Most software applications include separate modules coded by different programmers having potentially different styles or programming logic. Integration testing may assist in evaluating the interactions between the different modules to identify potential issues pertaining to the interoperability of the different modules comprising the given software application. Integration test cases vary from the test cases used in unit testing which focus on the unit functions themselves in that integration test cases focus instead on the integrating links which integrate separate modules and through which information is permitted to pass between the modules. Additionally, it may be understood that different approaches may be utilized for integration testing including a "big bang approach" in which all of the interfaces formed between the separate modules comprising a software application are tested and incremental approaches in which only selected interfaces are tested.

Conventionally, integration testing is followed by system testing in which the entire system is compiled and then tested as a whole to verify that the system meets all pertinent requirements such as functional requirements, security requirements, and others. For example, following the integration testing of the various interfaces formed between the separate modules of a given software application, the software application itself may be compiled and then tested as a whole to ensure the software application meets all pertinent requirements. Acceptance testing may follow the successful completion of system testing. Unlike unit, integration, and system testing, which is often performed by the developer of the given system being tested, acceptance testing may be performed by the user of the system in their own environment and thus may also be referred to as user acceptance testing (UAT).

While there can be a degree of overlap between functional and non-functional testing, conventionally non-functional testing is generally separate and distinct from functional testing. For example, functional testing typically precedes non-functional testing in conventional testing schemes. Additionally, functional testing typically comprises white box testing in which the tester has access to the underlying internal structure of the system (e.g., the underlying internal data structures or source code) being tested while non-functional testing often comprises block box testing where the tester acts without knowledge of the internal structure of the system being tested, instead treating the internal structure as a "block box."

Unlike the functional testing described above which seeks to verify specific functions or actions of the computer system (e.g., the tested functions perform as intended as defined in the design requirements of the function), non-functional testing verifies that the computer system or component(s) thereof function as intended even in environments in which the system receives unexpected or demanding inputs. As but one example, non-functional testing may verify how many users may concurrently access a given service or feature of the computer system.

One specific type of non-functional testing is performance testing which exercises the computer system being tested under a controlled, sanitized environment to thereby test the stability, reliability, speed, response time, scalability (e.g., how many users can simultaneously access a given feature), and resource usage of a given computer system or component(s) thereof under different workloads and in different operating environments. In this manner, performance testing may determine if a given computer system responds quickly upon prompting, the maximum user load the computer system can handle at a given time, and if the computer system is stable under different workloads.

Non-functional testing may provide valuable insight to stakeholders regarding the speed, stability, and scalability of a computer system (e.g., of a software application executable on the computer system) such that potential issues may be identified and addressed promptly. However, conventionally, non-functional testing focuses on the performance characteristics (e.g., the speed, stability, and scalability) of the system or operating environment as a whole, without reference to the behavior of the system from the perspective of the user accessing the system. For example, a computer system may be loaded or exercised to gauge the system's performance with respect to a particular feature or service offered by the system. A conventional non-functional test, such as a performance or loading test, focuses on the performance of the system from the system's perspective—e.g., how many users can simultaneously access the service being tested? What changes occur to the performance or capabilities of the system as the load applied to the system through the service being tested is intentionally varied through the performance test? Conventional non-functional testing does not focus on the user's experience of the service as the performance or other non-functional test is being conducted, such as, for example, the various wait times encountered by the user as the user accesses the service provided by the computer system.

In an embodiment, systems and methods for testing a computer system accessible by a plurality of users are provided. Particularly, a testing tool of a testing system may execute a user-focused performance test case associated with a service of the computer system accessible by the plurality of users of the computer system. The performance test case executed by the testing tool may contain a description defining a sequence of actions to be executed by the computer system, and an expected result. The expected result may be associated with a performance profile for each of the plurality of users of the computer system, the performance profile for each of the plurality of users being previously determined by the testing tool. The performance profile for each user may be contingent on the characteristics of the user equipment of a given user, as well as characteristics of the service of the computer system associated with the given performance test case.

In an embodiment, the testing tool applies a load to the computer system in response to executing the sequence of actions defined by the performance test case. In some embodiments, by applying the load to the computer system a volume of interactions on the computer system associated with the service increases incrementally in a controlled manner. The application of the load may be predefined by the performance of the test case. For instance, the manner in which the load is applied to the computer system may be defined by the description of the performance test case.

In an embodiment, a monitoring tool of the testing system monitors a set of one or more experience parameters of the computer system that define a user experience of the service for each of the plurality of users as the performance test case is executed, wherein the set of one or more experience parameters is each associated with a specific user of the plurality of users. Thus, unlike conventional performance testing which focuses on the response of the operating environment to the application of a load thereto, the performance test case executed by the testing tool and monitored by the monitoring tool concerns parameters relevant to the user's experience of the particular service associated with the performance test case. In this manner, a functional test associated with the service being tested may be converted into a performance test that focuses on the user's experience of the given function being tested in an E2E manner.

In an embodiment, the monitoring tool relies on "sensors" (e.g., monitoring tools and/or other applications providing monitoring functionality) of the computer system configured to capture information pertaining to the one or more experience parameters of the computer system monitored by the monitoring tool. These monitoring tools may be located on components of the computer system in addition to the one or more servers of the computer system responsible for providing the service of the computer system engaged by the testing tool of the testing system. For example, the monitoring tool may monitor sensors located on user equipment (UE) of users accessing the specific service or any other component of the computer system whose performance may meaningfully impact the one or more experience parameters.

To state in other words, the monitoring performed by the monitoring tool is centered on the user's experience of the given service and thus information monitored by the monitoring tool may extend beyond simply the particular components of the computer system responsible for provisioning or providing the given service. In this manner, the results of the testing performed by the testing system may be used to not only optimize the one or more components of the computer system responsible for provisioning the given service, but also to optimize additional components of the computer system (potentially including applications executed on the UE of the user) whose performance may meaningfully impact the user's experience of the service. By monitoring more than simply the specific components of the computer system directly responsible for providing the given service, the testing system may more fully or completely optimize the computer system in an end-to-end manner to maximize the user's experience of the given service.

In an embodiment, the monitoring tool of the testing system may, in addition to the functions described above, aggregate the set of one or more experience parameters, wherein the aggregated set of one or more experience parameters define an actual result of the performance test case, and communicate the actual result to the testing tool. Additionally, in an embodiment, the testing tool may compare the expected result of the performance test case with the actual result of the performance test case to evaluate the impact of the applied load to the experience of the service by the plurality of users. Further, in an embodiment, the testing system may include an optimization tool to adjust a set of resources of the computer system provisioned to the service based on the comparison by the testing tool between the expected result and the actual result. In this manner the testing system may dynamically adjust and shift resources between various services of the communication system so as to maximize the user's experience of the services accessible by the user.

Turning to FIG. 1, a communication system 100 is described. As previously described, it may be understood that communication system 100 comprises a computer system, such as a networked computer system. In an embodiment, the communication system 100 generally includes an electronic device (user equipment—UE) 102, an access node 120, a network 122, a data store 124, a server 130, and a testing system 140. The UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 122 such as an enterprise, organization, or individual.

The access node 120 of communication system 100 may provide communication coupling the UE 102 to the network 122 according to a 5G protocol, for example 5G, 5G New Radio, or 5G LTE radio communication protocols. The access node 120 may provide communication coupling the UE 102 to the network 122 according to a long term evolution (LTE), a code division multiple access (CDMA), and/or a global system for mobile communication (GSM) radio communication protocol. The access node 120 may be referred to for some contexts as a gigabit Node B (gNB), an enhanced Node B (eNB), a cell site, or a cell tower. Additionally, while not shown, UE 102 may be communicatively coupled to the network 122 via a WiFi access point or another non-cellular radio device. Further, while a single access node 120 is illustrated in FIG. 1, it is understood that communication system 100 may comprise any number of access nodes 120.

The network 122 of communication system 100 may comprise one or more public networks, one or more private networks, or a combination thereof. For example, network 122 may comprise a 5G core network. Further details of 5G networks are discussed below with reference to FIGS. 5A, 5B. While shown as communicatively coupled to the network 122, data store 124, server 130, and testing system 140 may be considered part of network 122 and are illustrated as separate from network 122 in FIG. 1 to promote discussing their roles with respect to UE 102, as will be discussed further herein. Additionally, although in FIG. 1 network 122 is shown as including only a single data store 124 and server 130, it may be understood that network 122 may include varying numbers of data stores and servers.

The UE 102 includes a processor or CPU 104 and a memory 106 in signal communication with the processor 104. Additionally, UE 102 includes one or more client applications 108 stored in the memory 106 and executable by the processor 104. Additionally, the execution of client applications 108 by a user of UE 102 may generate one or more notifications 110 based on the actions of the user and associated with the client applications 108.

UE 102 may access various resources of network 122 through the access node 120. For example, a user of UE 102 may transmit information from UE 102 to the network 122 through the access node 120 and save the transmitted information on the network 122, such as on data store 124. In addition, UE 102 may particularly access resources of the server 130, where server 130 may include one or more application programming interfaces (APIs) 132 and one or more server applications 134. Server applications 134 may provide one or more services or features accessible by the user through the UE 102. For example, UE 102 may access server applications 134 by making one or more calls to the APIs 132 of server 130. The accessing of the one or more server applications 134 by the UE 102 through APIs 132 may trigger the generation of one or more notifications 110 by the client applications 108 of UE 102.

Testing system 140 of communication system 100 may access various resources and components of communication system 100 such as, for example, UE 102, data store 124, and server 130 via the network 122. Testing system 140 of communication system 100 is generally configured to test the communication system 100 and components thereof. As an example, testing system 140 may conduct tests of the server applications 134 of server 130 and/or the client applications 108 of UE 102, as well as other features of the communication system 100. At least some of the testing conducted by testing system 140 may be automated by the testing system 140. Additionally, at least some of the testing conducted by testing system 140 may be in response to manual intervention by an operator. For example, testing operators or testers of the communication system 100 may access the testing system 140 to conduct one or more tests of the communication system 100. Additionally, in some embodiments, personnel other than the testers of communication system 100 may access the testing system 140 such as, for example, developers of software executable on the communication system 100, such as developers of the client applications 108 of UE 102 and/or the server applications 134 of server 130.

Additionally, testing system 140 is configured to perform both functional and non-functional testing of the communication system 100. Particularly, testing system 100 may conduct unit testing, integration testing, system testing, and other forms of functional testing on the communication system 100 and its various components and features. For example, testing system 140 may conduct unit testing of selected sections of code or building blocks of one of the server applications 134 of server 130. As another example, testing system 140 may conduct integration testing of the interfaces linking a plurality of building blocks comprising one of the server applications 134. As a further example, testing system 140 may conduct system testing of the communication system 100 or components thereof such as server 130 and its server applications 134.

In addition to functional testing, testing system 140 is configured to conduct one or more non-functional tests of the communication system 100 and its various components. Particularly, testing system 140 may conduct performance or other non-functional testing of the communication system 100 and its various components to verify the speed, scalability, security, and reliability of the communication system 100. Additionally, testing system 140 is configured to conduct non-functional, performance testing of the communication system 100 from the perspective of the user accessing the communication system 100 through the UE 102. This performance testing may capture or document the user's experience as the user accesses one or more services or features of the communication system 100.

In this exemplary embodiment, testing system 140 generally includes a testing tool 142, a monitoring tool 144, and an optimization tool 146. It may be understood that in other embodiments the configuration of testing system 140 may vary. For instance, in some embodiments, testing system 140 may include testing tool 142 and monitoring tool 144 but not the optimization tool 146. Additionally, it may be understood that the components of testing system 140 may not be located on the same server or computing device, and instead may be distributed across a plurality of computing devices having access to the network 122.

The testing tool 142 is generally configured to execute one or more functional and non-functional tests of the communication system 100 conducted by the testing system 140. For example, the testing tool 142 may assist (e.g., in collaboration with an operator of testing system 140) in formulating a plurality of test cases used in conducting the one or more functional and non-functional tests conducted by testing system 140. Additionally, testing tool 142 may execute at least some of the sequence of actions corresponding to a given test case, such as the sequence of actions prescribed by the description of the test case. The testing tool 142 may also assist (e.g., in collaboration with an operator of testing system 140) in defining one or more expected results of the given test case. Further, the testing tool 142 may compare the expected result defined by the test case with an actual result obtained from performing the given test. In this manner, testing tool 142 may assist with comparing the expected result with the actual result of the given test case to evaluate how the communication system 100 performed with respect to the objective of the given test case.

In certain embodiments, the expected result of a performance test case executable by testing tool 142 is associated with a performance profile for each of the plurality of users of communication system 100, the performance profile for each of the plurality of users being previously determined by the testing tool 142. The performance profile for each user may be contingent on the characteristics of the UE 102 of a given user (e.g., the processing and/or memory capabilities of processor 104 and memory 106 of UE 102, respectively). Additionally, the performance profile for each user may also be contingent on the characteristics of the service of communication system 100 (e.g., a service offered by one of the server applications 134 of server 130) associated with the given performance test case. In certain embodiments, testing tool 142 is configured to adjust the performance profile for at least one of the plurality of users in response to a modification of the service of the communication system 100. For instance, an addition of a new feature to the service requiring additional resources from the communication system 100 (e.g., from the UE 102 and/or server 130) may necessitate an adjustment of the performance profile of one or more users with access to the service to reflect the additional burden created by the new feature.

In an embodiment, the testing tool 142 is configured to execute a performance test case associated with a service of the communication system 100 accessible by a plurality of users of the communication system 100. For example, the performance test case may pertain to a service offered by one of the server applications 134 of server 130 accessible by the UE 102 via one of the APIs 132 of server 130. The performance test case executed by the testing tool 142 may define both a description containing a sequence of actions to be executed by the communication system 100 and an expected result of the performance test case.

Additionally, the testing tool 142 may apply a load to the communication system 100 in response to executing the sequence of actions of the performance test case. In some embodiments, by applying the load to the communication system 100 a volume of interactions on the communication system 100 associated with the service increases incrementally. For example, testing tool 142 may apply a load to communication system 100 whereby a volume of interactions on the communication system 100 associated with a service provided by one of the server applications 134 (e.g. the number of interactions between users of communication system 100 and the server application 134 over a given period of time) of server 130 increases incrementally.

The monitoring tool 144 of testing system 100 is generally configured to monitor the performance of communication system 100 during the performance of a test of communication system 100 executed by the testing tool 142 of testing system 140. The monitoring tool 144 may capture data from the communication system 100 which comprises the actual result of a given test case. The monitoring tool 144 may communicate the actual result to the testing tool 142 for comparison with the expected result of the test case.

In an embodiment, monitoring tool 144 is configured to monitor one or more experience parameters of communication system 100 that define a user experience of the service (e.g., a service offered by one of the server applications 134 of server 130) as the performance test case is executed and the volume of interactions associated with the service increases incrementally. The one more monitored experience parameters monitored by monitoring tool 144 may comprise an actual result of the performance test case executed by the testing tool 142. Additionally, the monitoring tool 144 may aggregate the set of one or more experience parameters, wherein the aggregated set of one or more experience parameters define an actual result of the performance test case.

The one or more experience parameters monitored by monitoring tool 144 may comprise a variety of differing parameters that are associated with or define the user experience of users of a service of the communication system 100, such as a service provided by one of the server applications 134 of server 130. For example, in some embodiments, the one or more experience parameters includes a latency period between a first point in time when an action performed by one of the users of the plurality of users on UE 102 of the user, and a second point in time when a signal is received by the UE 102 in response to the performance of the action by the user. The signal may comprise a notification 110 produced by the UE 102 in response to the performance of the action by the user. For instance, the notification 110 may be triggered by the user attempting to access a service provided by one of the server applications 134 of server 130. Alternatively, the signal may comprise a file or other artifact deliverable from the server 130 to the UE 102 via one of the APIs 132 of server 130.

In some embodiments, the one or more experience parameters include at least one of a processor usage of a processor of the communication system 100, and a memory usage of a memory of the communication system 100. Specifically, the processor usage may correspond to a processor usage of the processor 104 of UE 102 and the memory usage may correspond to a memory usage of the memory 106 of UE 102. It may be understood that elevated usage of processor 104 and/or memory 106 in response to the UE 102 interacting with a service offered by communication system 100 may at least temporarily undesirably reduce the performance or functionality of the UE 102.

In some embodiments, testing tool 142 is configured to compare the expected result of the performance test case with the actual result of the performance test case to evaluate the impact of the applied load to the experience of the service by the plurality of users of the communication system 100. In contrast with conventional performance tests which focus on the behavior of the operating environment, the comparison performed by testing tool 142 instead focuses specifically on the experience of the users of the particular service or feature being tested. To state in other words, the testing tool 142 seeks to uncover how the application of load to the communication system 100 (e.g., to the server 130 hosting the particular service) affects the user's experience of the particular service—does the applied load result in delayed notifications 110 associated with the service? Does the applied load result in elevated use of the resources of UE 102 which may degrade the performance of UE 102? Additionally, testing tool 142 may interleave this user-focused performance test case with conventional test cases such as conventional functional test cases. For example, the testing tool 142 may interleave a user-focused performance test case between separate integration tests, system tests, and/or acceptance tests of the communication system 100.

In certain embodiments, testing tool 142 is configured to identify a threshold load of the load applied to the communication system 100 that is associated with a degraded user experience of the service based on the comparison of the expected result of the performance test case with the actual result of the performance test case. The degraded user experience may correspond to a substantial change to one or more of the experience parameters monitored by the monitoring tool 144. In some embodiments, a degraded user experience corresponds to a change that is equal to or greater than 10% to one or more of the experience parameters. In certain embodiments, a degraded user experience corresponds to a change that is equal to or greater than 25% to one or more of the experience parameters. In certain embodiments, a degraded user experience corresponds to a change that is equal to or greater than 50% to one or more of the experience parameters. For example, a degraded user experience may correspond to an increase in the processor usage of the processor 104 or an increase in the memory usage of the memory 106 of UE 102 that exceeds a threshold degree (e.g., 10% increase, 25% increase, 50% increase). In another example, a degraded user experience may correspond to an increase in the processor usage of the processor or an increase in the memory usage of the server 130 offering the particular service that exceeds a threshold degree (e.g., 10% increase, 25% increase, 50% increase). In still another example, a degraded user experience may correspond to an increase in a latency period that exceeds a threshold degree (e.g., 10% increase, 25% increase, 50% increase).

The optimization tool 146 of testing system 100 is generally configured to adjust or optimize the workings of communication system 100 based on the result of a given test case as evaluated by the testing tool 142. For example, in view of a discrepancy between an expected result and an actual result of a given test case identified by the testing tool 142, the optimization tool 146 may reallocate various resources of the communication system 100 such that they are available for use by the service of communication system 100 associated with the given test case. Dynamic load balancing is but one example of the type of reallocation of resources of communication system 100 that may be accomplished by optimization tool 146 based on the results of a given test case evaluated by the testing tool 142 of testing system 140.

In some embodiments, optimization tool 146 is configured to adjust the set of resources of the communication system 100 provisioned to a service (e.g., a service offered by one of the server applications 134 of server 130) associated with a performance test case based on the comparison by the testing tool 142 between the expected result and the actual result. For example, resources (e.g., processing resources, memory resources, communication bandwidth resources) from a server other than server 130 may be additionally provisioned to the particular service being tested based on the comparison by the testing tool 142 between the expected result and the actual result.

In some embodiments, monitoring tool 144 is configured to determine that a current load of the communication system 100 matches or exceeds the threshold load identified by the testing tool 142. For example, monitoring tool 144 may determine that a load currently applied to server 130 (server 130 offering a service being tested in this example) matches or exceeds a threshold load previously identified by the testing tool 142 associated with a degraded user experience. As used herein, the term "matches" or "matching" does not necessarily mean that the current load is exactly equal to the threshold load but instead is equal to or substantially equal (e.g., within 10% of the threshold load, within 5% of the threshold load) to the threshold load. In certain embodiments, optimization tool 146 is configured to adjust the set of resources of the communication system 100 provisioned to the service in response to determining that the current load matches or exceeds the threshold load. For example, resources (e.g., processing resources, memory resources, communication bandwidth resources) of communication system 100 may be additionally provisioned to the particular service being tested based on the determination of the current load matching or exceeding the threshold load.

Figure 2:
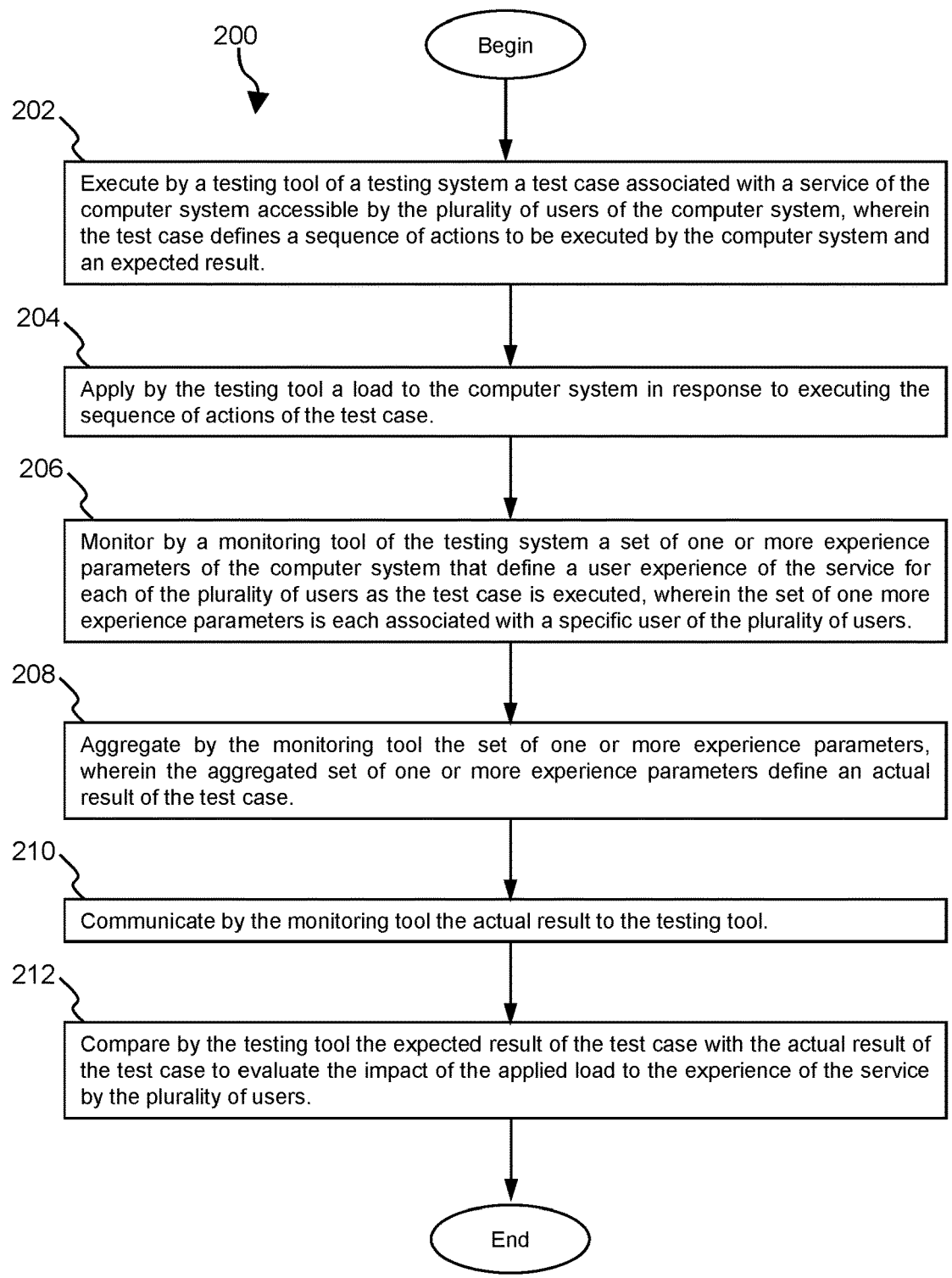
FIG. 2 is a flow chart of a method according to an embodiment of the disclosure.

Turning to FIG. 2, a method 200 is described. In an embodiment, the method 200 is a method for testing a computer system (e.g., the communication system 100 illustrated in FIG. 1 may comprise or define a computer system) accessible by a plurality of users. At block 202, the method 200 comprises executing by a testing tool (e.g., testing tool 142 illustrated in FIG. 1) of a testing system (e.g., testing system 140 illustrated in FIG. 1) a test case associated with a service of the computer system accessible by the plurality of users of the computer system, wherein the test case defines a sequence of actions to be executed by the computer system and an expected result. At block 204, the method 200 comprises applying by the testing tool a load to the computer system in response to executing the sequence of actions of the test case.

At block 206, the method 200 comprises monitoring by a monitoring tool (e.g., monitoring tool 144 illustrated in FIG. 1) of the testing system a set of one or more experience parameters of the computer system that define a user experience of the service for each of the plurality of users as the test case is executed, wherein the set of one more experience parameters is each associated with a specific user of the plurality of users. At block 208, the method 200 comprises aggregating by the monitoring tool the set of one or more experience parameters, wherein the aggregated set of one or more experience parameters define an actual result of the test case. At block 210, the method 200 comprises communicating by the monitoring tool the actual result to the testing tool. At block 212, the method 200 comprises comparing by the testing tool the expected result of the test case with the actual result of the test case to evaluate the impact of the applied load to the experience of the service by the plurality of users.

Figure 3:
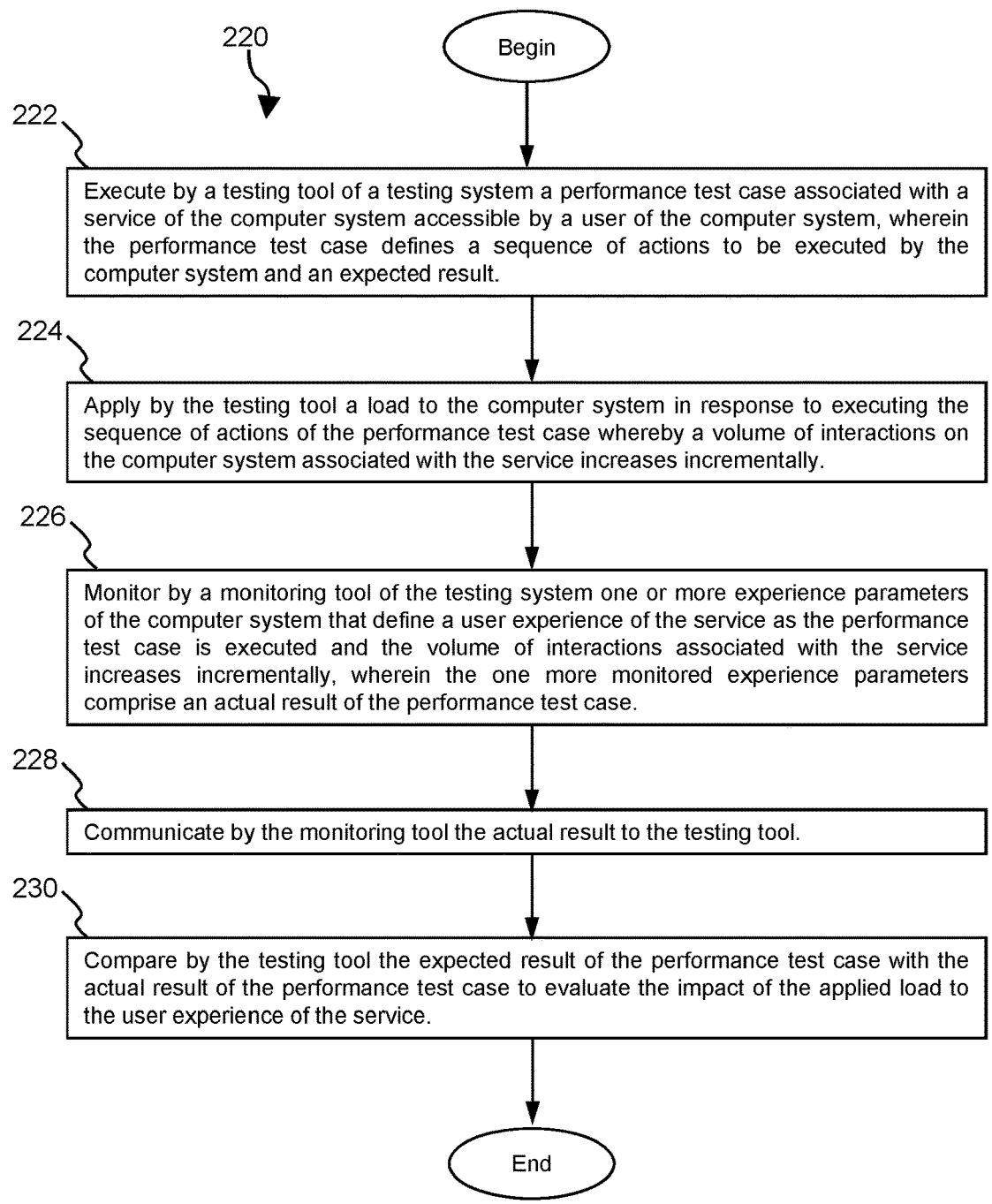
FIG. 3 is a flow chart of another method according to an embodiment of the disclosure.

Turning to FIG. 3, a method 220 is described. In an embodiment, the method 220 is a method for testing a computer system (e.g., the communication system 100 illustrated in FIG. 1 may comprise or define a computer system) accessible by a plurality of users. At block 222, the method 220 comprises executing by a testing tool (e.g., testing tool 142 illustrated in FIG. 1) of a testing system (e.g., testing system 140 illustrated in FIG. 1) a performance test case associated with a service of the computer system accessible by a user of the computer system, wherein the performance test case defines a sequence of actions to be executed by the computer system and an expected result. At block 224, method 220 comprises applying by the testing tool a load to the computer system in response to executing the sequence of actions of the performance test case whereby a volume of interactions on the computer system associated with the service increases incrementally.

At block 226, method 220 comprises monitoring by a monitoring tool (e.g., monitoring tool 144 illustrated in FIG. 1) of the testing system one or more experience parameters of the computer system that define a user experience of the service as the performance test case is executed and the volume of interactions associated with the service increases incrementally, wherein the one more monitored experience parameters comprise an actual result of the performance test case. At block 228, method 220 comprises communicating by the monitoring tool the actual result to the testing tool. At block 230, method 220 comprises comparing by the testing tool the expected result of the performance test case with the actual result of the performance test case to evaluate the impact of the applied load to the user experience of the service.

Figure 4:
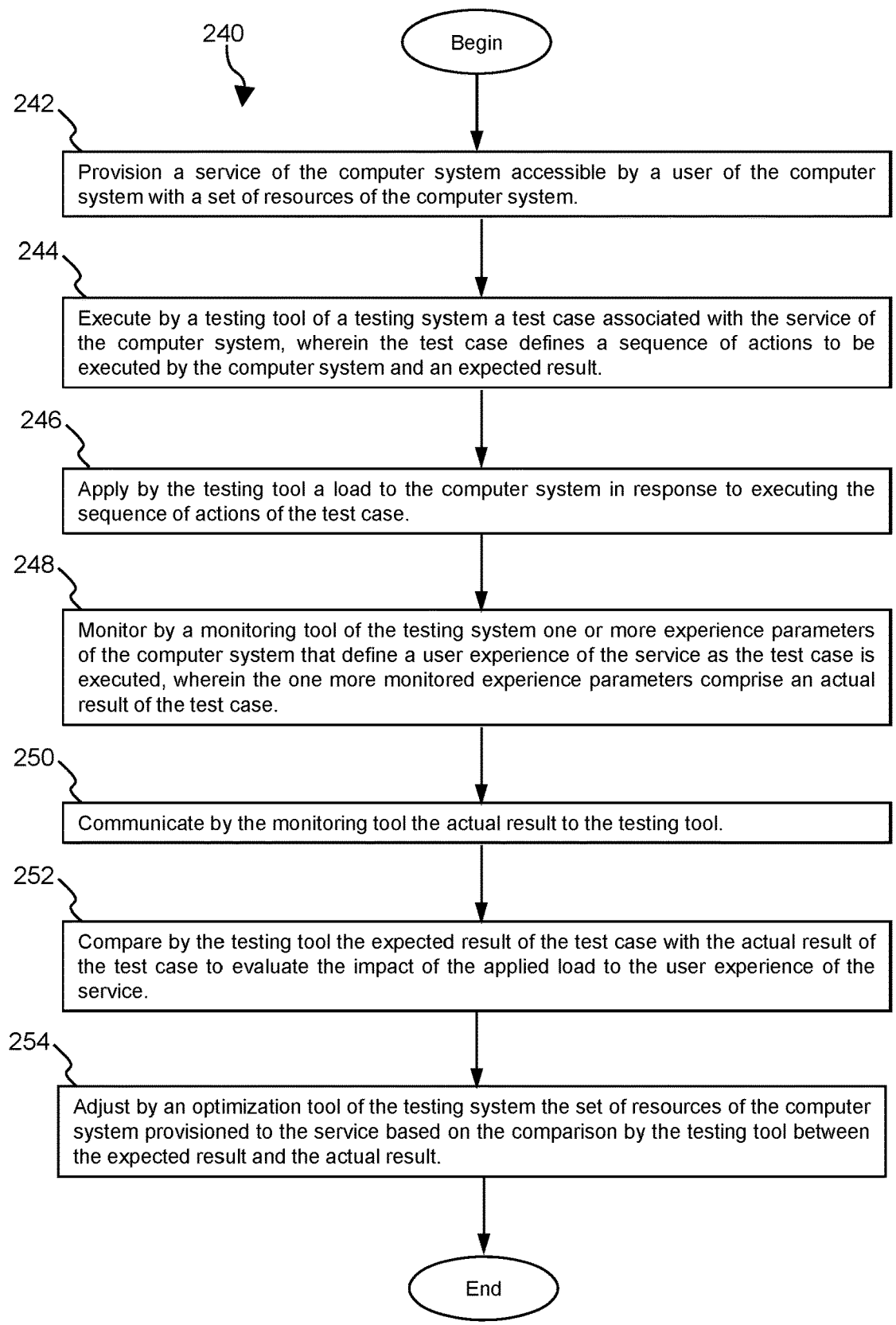
FIG. 4 is a flow chart of another method according to an embodiment of the disclosure.

Turning to FIG. 4, a method 240 is described. In an embodiment, the method 240 is a method for testing a computer system (e.g., the communication system 100 illustrated in FIG. 1 may comprise or define a computer system) accessible by a plurality of users. At block 242, the method 240 comprises provisioning a service of the computer system accessible by a user of the computer system with a set of resources of the computer system. At block 244, method 240 comprises executing by a testing tool (e.g., testing tool 142 illustrated in FIG. 1) of a testing system (e.g., testing system 140 illustrated in FIG. 1) a performance test case associated with the service of the computer system, wherein the performance test case defines a sequence of actions to be executed by the computer system and an expected result.

At block 246, method 240 comprises applying by the testing tool a load to the computer system in response to executing the sequence of actions of the performance test case. At block 248, method 240 comprises monitoring by a monitoring tool (e.g., monitoring tool 144 illustrated in FIG. 1) of the testing system one or more experience parameters of the computer system that define a user experience of the service as the performance test case is executed, wherein the one more monitored experience parameters comprise an actual result of the performance test case. At block 250, method 240 comprises communicating by the monitoring tool the actual result to the testing tool.

At block 252, method 240 comprises comparing by the testing tool the expected result of the performance test case with the actual result of the performance test case to evaluate the impact of the applied load to the user experience of the service. At block 254, method 240 comprises adjusting by an optimization tool (e.g., optimization tool 146 illustrated in FIG. 1) of the testing system the set of resources of the computer system provisioned to the service based on the comparison by the testing tool between the expected result and the actual result.

Figure 5A:
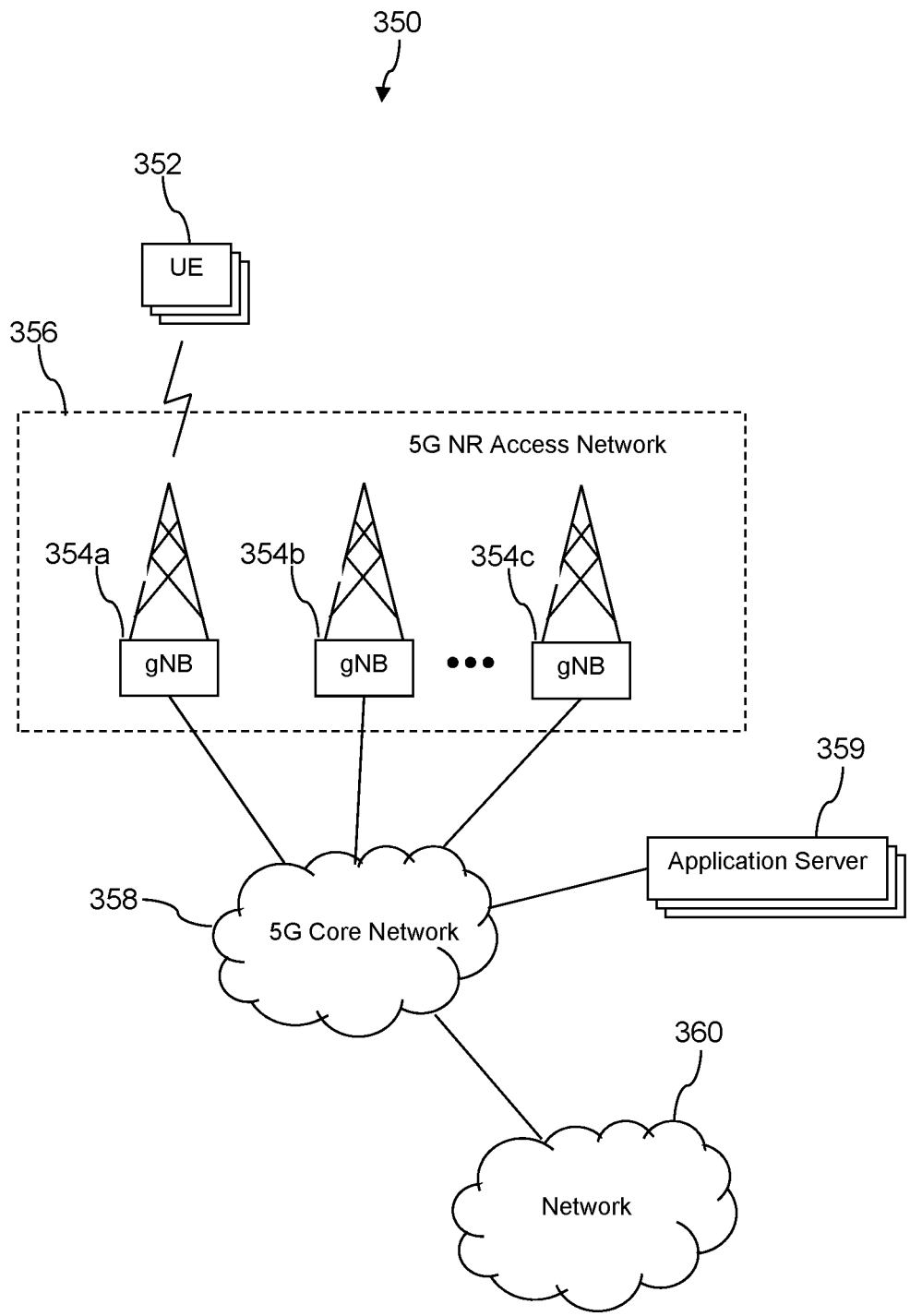
FIG. 5A is a block diagram of another communication system according to an embodiment of the disclosure.

Turning now to FIG. 5A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts. In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354a, a second access node 354b, and a third access node 354c. It is understood that the access network 356 may include any number of access nodes 354. Further, each access node 354 could be coupled with a core network 358 that provides connectivity with various application servers 359 and/or a network 360. In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354.

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
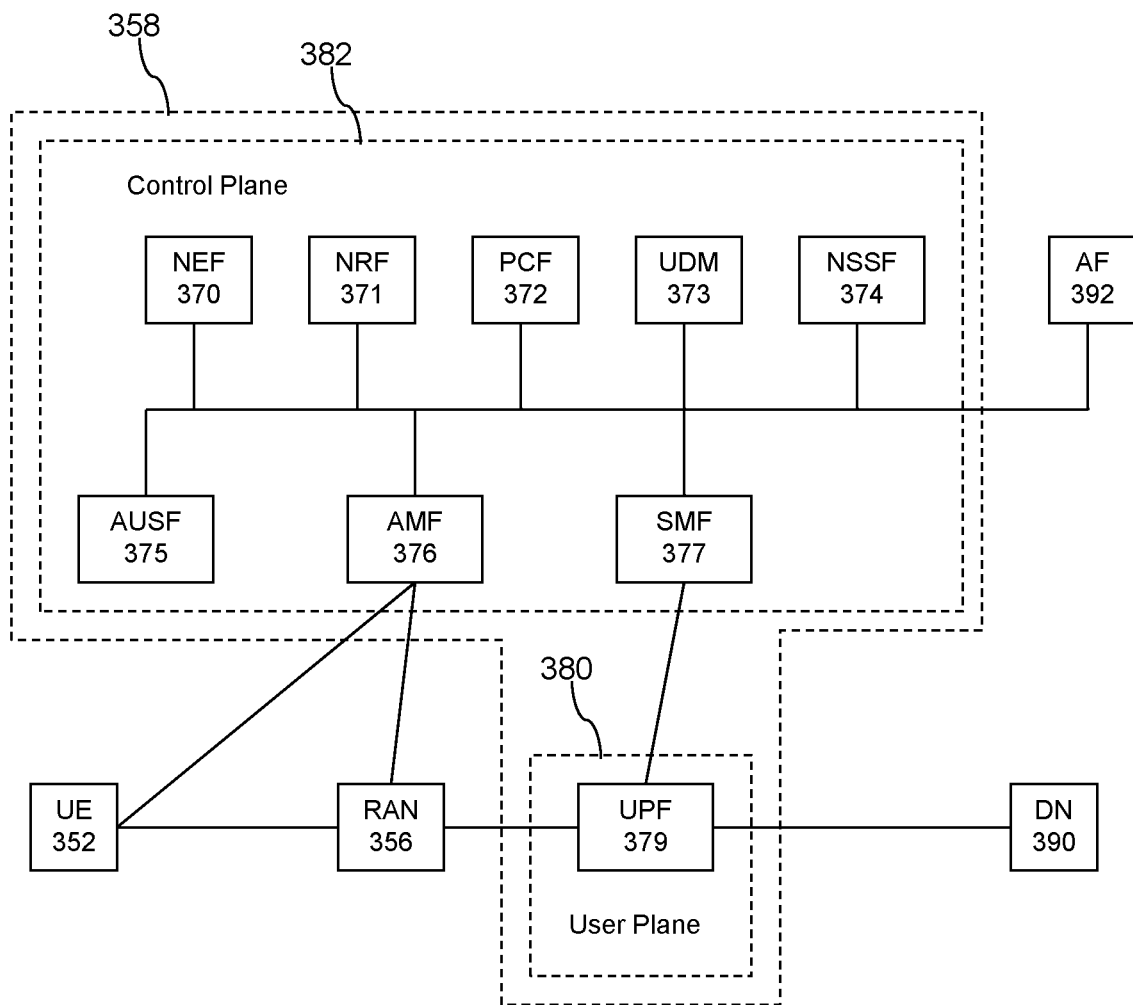
FIG. 5B is a block diagram of a core network of the communication system of FIG. 5A according to an embodiment of the disclosure.

Turning now to FIG. 5B, further details of the core network 358 are described. In an embodiment, the core network 358 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a session management function (SMF) 377, a network exposure function (NEF) 370, a network repository function (NRF) 371, a policy control function (PCF) 372, a unified data management (UDM) 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 5A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) protocol data unit (PDU) sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information, customer authentication number, and encryption keys for the information. An application function 392, which may be located outside of the core network 358, exposes the application layer for interacting with the core network 358. In an embodiment, the application function 392 may be execute on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Figure 6:
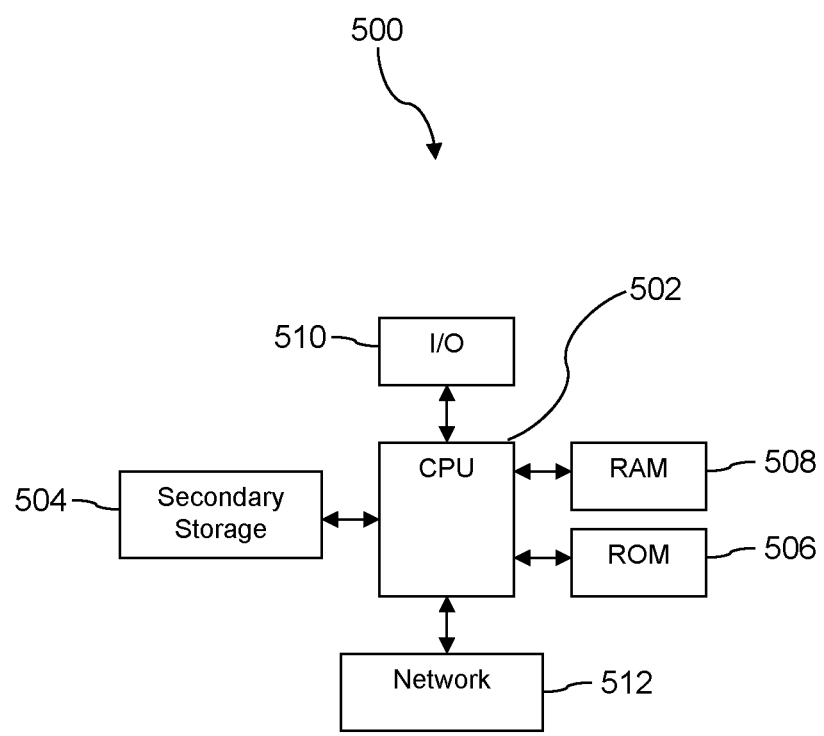
FIG. 6 is a block diagram of a computer system according to an embodiment of the disclosure.

FIG. 6 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of.

During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for testing a computer system accessible by a plurality of users, the method comprising:
   executing by a testing tool of a testing system a performance test case associated with a service of the computer system accessible by the plurality of users of the computer system, wherein the performance test case defines a sequence of actions to be executed by the computer system and an expected result;

applying by the testing tool a load to the computer system in response to executing the sequence of actions of the performance test case;

monitoring by a monitoring tool of the testing system a set of one or more user experience parameters of the computer system that define a user experience of the service for each of the plurality of users as the performance test case is executed, wherein the set of one more user experience parameters is each associated with a specific user of the plurality of users, wherein the one or more user experience parameters comprises a latency period between a first point in time when an action performed by one of the users of the plurality of users on user equipment of the user, and a second point in time when a communication is provided on the user equipment of the user in response to the performance of the action by the user;

aggregating by the monitoring tool the set of one or more user experience parameters, wherein the aggregated set of one or more user experience parameters define an actual result of the performance test case;

communicating by the monitoring tool the actual result to the testing tool; and comparing by the testing tool the expected result of the performance test case with the actual result of the performance test case to evaluate an impact of the applied load to the experience of the service by the plurality of users.

2. The method of claim 1, wherein the communication provided at the second point in time is a notification is produced on the user equipment of the user in response to the performance of the action by the user.

3. The method of claim 1, wherein the one or more user experience parameters comprises at least one of a processor usage of a processor of the computer system, and a memory usage of a memory of the computer system.

4. The method of claim 1, wherein the communication provided at the second point in time is a file being received by the user equipment from a server of the computer system in response to the performance of the action by the user.

5. The method of claim 1, wherein the expected result of the performance test case is associated with a performance profile for each of the plurality of users, the performance profile for each of the plurality of users being previously determined by the testing tool.

6. The method of claim 5, further comprising:
adjusting the performance profile for at least one of the plurality of users in response to a modification of the service of the computer system.

7. The method of claim 1, interleaving by the testing tool the performance test case with a second performance test case comprising a functional test of the service of the computer system, wherein the functional test comprises at least one of an integration test, a system test, and an acceptance test of the computer system.

8. A method for testing a computer system accessible by a plurality of users, the method comprising:
executing by a testing tool of a testing system a performance test case associated with a service of the computer system accessible by a user of the computer system, wherein the performance test case defines a sequence of actions to be executed by the computer system and an expected result;

applying by the testing tool a load to the computer system in response to executing the sequence of actions of the performance test case whereby a volume of interactions on the computer system associated with the service increases incrementally;

monitoring by a monitoring tool of the testing system one or more user experience parameters of the computer system that define a user experience of the service as the performance test case is executed and the volume of interactions associated with the service increases incrementally, wherein the one more monitored user experience parameters comprise an actual result of the performance test case, wherein the one or more user experience parameters comprises a latency period between a first point in time when an action performed by one of the users of the plurality of users on user equipment of the user, and a second point in time when a communication is provided on the user equipment of the user in response to the performance of the action by the user;

communicating by the monitoring tool the actual result to the testing tool; and comparing by the testing tool the expected result of the performance test case with the actual result of the performance test case to evaluate an impact of the applied load to the user experience of the service.

9. The method of claim 8, further comprising:
identifying by the testing tool a threshold load of the load applied to the computer system that is associated with a degraded user experience of the service based on the comparison of the expected result of the performance test case with the actual result of the performance test case.

10. The method of claim 8, further comprising:
interleaving by the testing tool the performance test case with a second test case comprising a functional test of the service of the computer system.

11. The method of claim 10, wherein the functional test comprises at least one of an integration test, a system test, and an acceptance test of the computer system.

12. The method of claim 8, wherein the communication provided at the second point in time is a signal received by a user equipment of the user from a server of the computer system in response to the performance of the action by the user.

13. The method of claim 8, further comprising:
adjusting by an optimization tool of the testing system the set of resources of the computer system provisioned to the service based on the comparison by the testing tool between the expected result and the actual result.

14. A method for testing a computer system accessible by a plurality of users, the method comprising:
provisioning a service of the computer system accessible by a user of the computer system with a set of resources of the computer system;

executing by a testing tool of a testing system a performance test case associated with the service of the computer system, wherein the performance test case defines a sequence of actions to be executed by the computer system and an expected result;

applying by the testing tool a load to the computer system in response to executing the sequence of actions of the performance test case;

monitoring by a monitoring tool of the testing system one or more user experience parameters of the computer system that define a user experience of the service as the performance test case is executed, wherein the one more monitored user experience parameters comprise an actual result of the performance test case, wherein the one or more experience parameters comprises a latency period between a first point in time when an action performed by one of the users of the plurality of users on user equipment of the user, and a second point in time when a notification is produced on the user equipment of the user in response to the performance of the action by the user;

communicating by the monitoring tool the actual result to the testing tool;

comparing by the testing tool the expected result of the performance test case with the actual result of the performance test case to evaluate an impact of the applied load to the user experience of the service; and adjusting by an optimization tool of the testing system the set of resources of the computer system provisioned to the service based on the comparison by the testing tool between the expected result and the actual result.

15. The method of claim 14, further comprising:
identifying by the testing tool a threshold load of the load applied to the computer system that is associated with a degraded user experience of the service based on the comparison of the expected result of the performance test case with the actual result of the performance test case.

16. The method of claim 15, further comprising:
determining by the monitoring tool that a current load of the computer system matches or exceeds the threshold load.

17. The method of claim 16, further comprising:
adjusting by the optimization tool the set of resources of the computer system provisioned to the service in response to the determination of the current load matching or exceeding the threshold load.

18. The method of claim 14, further comprising:
identifying by the testing tool a threshold load of the load applied to the computer system that is associated with a degraded user experience of the service based on the comparison of the expected result of the performance test case with the actual result of the performance test case.

19. The method of claim 14, wherein by applying the load to the computer system a volume of interactions on the computer system associated with the service increases incrementally.

20. The method of claim 14, wherein the communication provided at the second point in time is a signal received by a user equipment of the user from a server of the computer system in response to the performance of the action by the user.

* * * * *